A. & P. STAFFER.
THRESHING MACHINE AND SEPARATOR.

No. 99,366. Patented Feb. 1, 1870.

Witnesses;
Geo. W. Mabee
Jno. H. Brooks

Inventor;
A. & P. Staffer

2 Sheets—Sheet 2.
A. & P. STAFFER.
THRESHING MACHINE AND SEPARATOR.
No. 99,366. Patented Feb. 1, 1870.
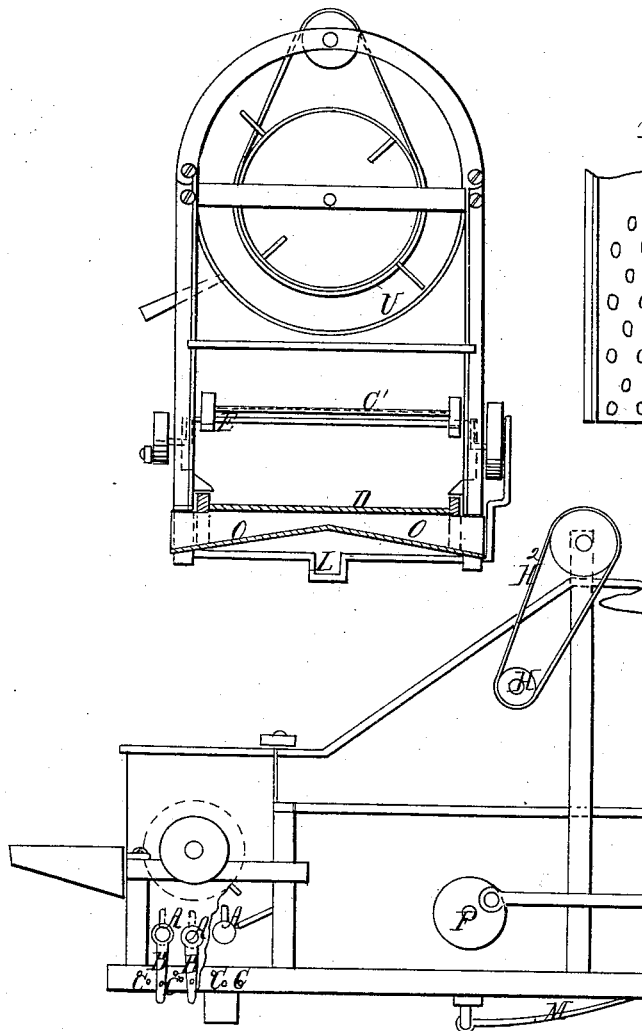
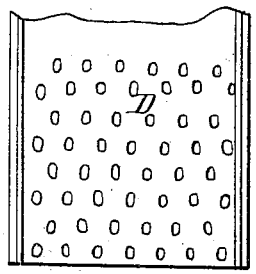
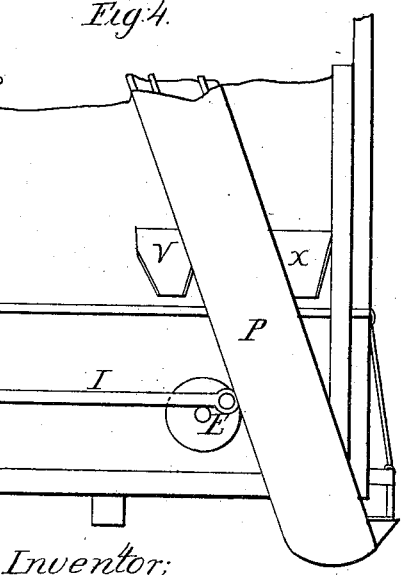
Witnesses;
Geo. W. Mabee
Jno. F. Brooks
Inventor;
A. & P. Staffer
per

United States Patent Office.

ABRAHAM STAFFER AND PETER STAFFER, OF SALT CREEK, INDIANA.

Letters Patent No. 99,366, dated February 1, 1870; antedated January 29, 1870.

IMPROVEMENT IN THRESHING-MACHINE AND SEPARATOR.

The Schedule referred to in these Letters Patent and making part of the same.

*To all whom it may concern:*

Be it known that we, ABRAHAM STAFFER and PETER STAFFER, of Salt Creek, in the county of Porter, and State of Indiana, have invented a new and improved Threshing and Cleaning-Machine; and we do hereby declare that the following is a full, clear, and exact description thereof, which will enable others skilled in the art to make and use the same, reference being had to the accompanying drawing, forming part of this specification.

This invention relates to improvements in threshing and cleaning-machines, designed to provide certain improvements in the construction and arrangement of the concave part of the thresher, calculated to make the same adjustable, for various kinds of grain, as required, and to reduce the strain on the spikes of both the cylinder and the concave, when any hard substance gets in with the grain.

Also, an improved arrangement of shaking and separating-sieves, to which the grain, straw, and chaff are delivered to the thresher for separation.

Also, an improved arrangement of screening and fanning-apparatus, to which the grain is carried from the straw-separating apparatus, and by which the grain is more thoroughly separated from the chaff and finer particles of foul matter; and Also, an improved arrangement for operating the straw of the carrying-screen, all substantially as hereinafter more fully specified.

Figure 3 represents a rear end view.

Figure 4 represents a partial longitudinal elevation of the side opposite to that shown in fig. 2.

Figure 5 represents a detail view of one of the separators.

Similar letters of reference indicate corresponding parts.

We make the concave part of the thresher of cylinders A, having end bearings, and capable of oscillation and adjustment on the same, by means of the arms B, projecting laterally from one or both ends to be secured in any position by wood pins, placed in the holes C in the framing. In this way, the spikes, which are supported on the said cylinders, may be adjusted readily to the spike-cylinder, or obliquely thereto, in either direction, as the nature of the grain may require, and the arms B, being secured by wood pins, will permit the escape of the said arms, by breaking the pins, in case of anything too hard for the spikes to break accidentally getting into the thresher, thereby saving the damage which usually occurs in such cases, where the concave part of the thresher is unyielding.

From this thresher the broken straw and grain are delivered to a horizontal carrying and separating-screen, C', running from the thresher nearly to the other end of the machine, and working over another carrier, D.

The screen C' has a rising-and-falling and to-and-fro movement imparted to it by transverse shafts E F, one of which is operated by a belt, G, from the fan-operating shaft H, and both being connected by a connecting-rod, I. It moves forward when in the elevated position, at which time the straw hugs closely to it by the action of the air and gravity thereon, due to the rising motion just previous to going forward, and the return movement occurs while it is in the lowest position, at which time the straw and chaff are, to some extent, suspended in the air, owing to the sudden downward movement, permitting the return of the screen, without carrying the straw and other light matter backward to the same extent that it is carried forward. The straw is delivered over the end at K.

By the motion of this screen, the grain is separated from the straw, and delivered upon another carrier, D, which has a to-and-fro motion imparted to it by a vibrating crank-shaft, F.

Figure 1:
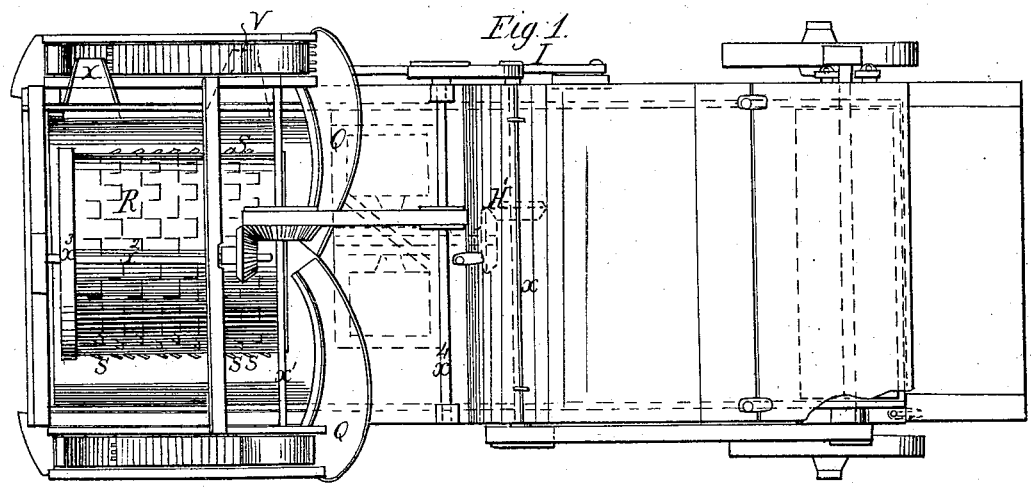
Figure 1 represents a plan view of a machine, constructed according to our improvements.
Figure 2:
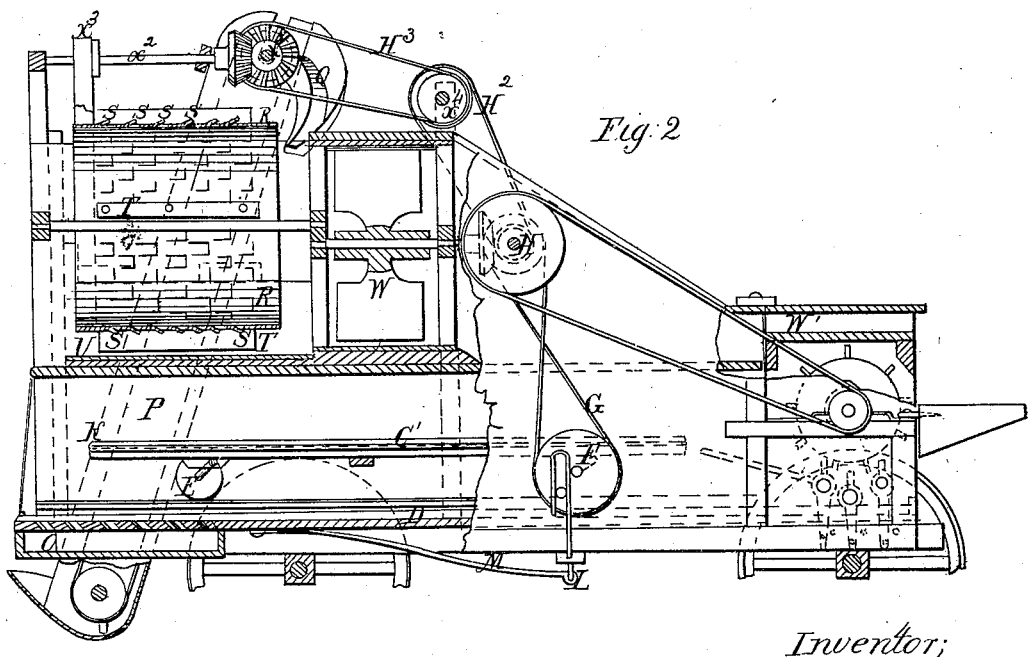
Figure 2 represents a longitudinal elevation, sectioned in certain parts.

From this carrier the grain, with the chaff and small matter not separated, is delivered through the oblique holes N to the lateral passages O, opening out at both sides, and discharging into the elevators P, one on each side, which convey it to the curved spouts Q, at the top, by which it is conveyed to the rotary screen R, made of perforated sheet-metal, the metal which is separated to form the perforations, not being wholly severed, but bent into the oblique positions represented at S, fig. 2.

This arrangement presents a rounded form or surface at the sides of the holes, toward the discharging-ends, whereby the escape of the straw, chaff, &c., is facilitated, as is also the case with the oblique perforations in the outer end of the carrier D.

The said screen R is provided with longitudinal strips T, projecting radially, both internally and externally, the internal strips being to carry up the chaff and light matter, to expose it to the blast to better advantage, and the external strips are designed to scrape the grain from the concave receiver U, into the elevated lateral spouts V and X, to fall into one of the elevators, for passing through the screen again.

W represents a fan, arranged in front of the inner end of the screen, which receives the air through a passage, W', in the top of the casing, purposely located to draw the dust from the place of feeding away from the operator, and the said fan delivers a blast through the screen, for carrying off the light matter.

This fan is operated by bevel-wheels from the shaft H, as shown at $H^1$, and from this shaft the elevators are also operated by belts H² and H³, working over pulleys on an intermediate shaft, H⁴, to the shaft X¹.

From the latter the screen R is driven by bevel-wheels, a shaft, X², and belt X³.

Having thus described our invention,

What we claim as new, and desire to secure by Letters Patent, is—

1. Supporting the spikes of the concave part of the thresher on transverse bars A, capable of oscillation, and provided with arms B, for adjusting and securing by wood pins, substantially as specified.

2. The combination of the horizontal reticulated carrying-screen C', extending from the thresher nearly to the end of the machine, with the supplementary carrier D, each being operated as shown and described.

3. The arrangement, with reference to the shaker and carrier C', of the crank-shafts E F, and connecting-rod I, for the purpose of imparting to it a vertical and horizontal movement, at the times and in the manner described.

4. The combination, with the carriers C' D, and the screen R, of the elevators P, arranged as specified.

5. The sheet-metal screen, provided with the projecting lips S, substantially as specified.

6. The arrangement, with the screen and the concave receiver, of the radial plates T, substantially as specified.

The above specification of my invention signed by me, this 13th day of February, 1869.

ABRAHAM STAFFER.
PETER STAFFER.

Witnesses:
JOHN R. MILLAR,
JOSEPHUS BLOCKLY.